United States Patent [19]

Kassai

[11] 4,111,454
[45] Sep. 5, 1978

[54] FOLDING BABY CARRIAGE

[75] Inventor: Kenzou Kassai, Osaka, Japan

[73] Assignee: Kassai Kabushikikaisha, Osaka, Japan

[21] Appl. No.: 839,118

[22] Filed: Oct. 3, 1977

Related U.S. Application Data

[63] Continuation-in-part of Ser. No. 720,445, Sep. 3, 1976, abandoned.

[30] Foreign Application Priority Data

Jul. 15, 1976 [JP] Japan .................................. 51-84593
Jul. 23, 1976 [JP] Japan ............................ 51-99045[U]

[51] Int. Cl.² ............................................. B62B 11/00
[52] U.S. Cl. ..................................... 280/649; 280/650
[58] Field of Search ............... 280/649, 650, 647, 642, 280/643, 644, 648; 297/45

[56] References Cited

U.S. PATENT DOCUMENTS

| | | | |
|---|---|---|---|
| 3,917,302 | 11/1975 | Gebhard | 280/650 |
| 3,976,309 | 8/1976 | Montonelli | 280/644 |
| 3,995,882 | 12/1976 | Watkins | 280/650 |
| 4,007,947 | 2/1977 | Perego | 280/642 |
| 4,030,769 | 6/1977 | Peng et al. | 280/650 |

Primary Examiner—Robert R. Song
Attorney, Agent, or Firm—Browdy and Neimark

[57] ABSTRACT

A folding baby carriage naturally locked in an opened state by the weight of the baby exerted to first connecting rods. The carriage cannot become folded unexpectedly during running. A first one of the connecting rods is pivotally coupled to a front leg. A second connecting rod which has a U-shaped section is pivotally coupled to the first connecting rod at one end and pivotally coupled to a rear leg at the other end which is rotatably crossed and mounted to the front leg. A bent rod is pivotally coupled to the first connecting rod at one end, and a front supporting rod is pivotally coupled to the front leg at one end and is pivotally and foldably connected to an opposite front supporting rod at the other end. The other end of the bent rod is pivotally coupled to the front supporting rod.

4 Claims, 6 Drawing Figures

FOLDING BABY CARRIAGE

CROSS-REFERENCE TO RELATED APPLICATION

This application is a continuation-in-part of the patent application of Kenzou Kassai, Ser. No. 720,445, filed Sept. 3, 1976, entitled "Folding Baby Carriage," which application is incorporated by reference herein in its entirety.

BACKGROUND OF THE INVENTION

The present invention relates to a folding baby carriage which cannot become unexpectedly folded during running. Generally, folding baby carriages are very convenient when utilizing other transportation facilities; they are widely used. It is necessary that folding baby carriages do not become folded unexpectedly during running, even if stones or the like collide with the wheels of the carriages. On the other hand, if the folding baby carriage is provided with a special locking device as conventional ones sometimes are, there is a problem that the folding or opening operation of the baby carriage becomes difficult or troublesome.

SUMMARY OF THE INVENTION

It is an object of the present invention to provide a folding baby carriage which is naturally locked in an opened state without using any special locking device and which does not unexpectedly become folded during running.

Another object of the present invention is to provide a folding baby carriage which can be easily opened or folded, consisting of a simple structure.

Other and further objects, features and advantages of the invention will appear more fully from the following description and the accompanying sheets of drawing.

DETAILED DESCRIPTION OF THE PREFERRED EMBODIMENT

Figure 1:
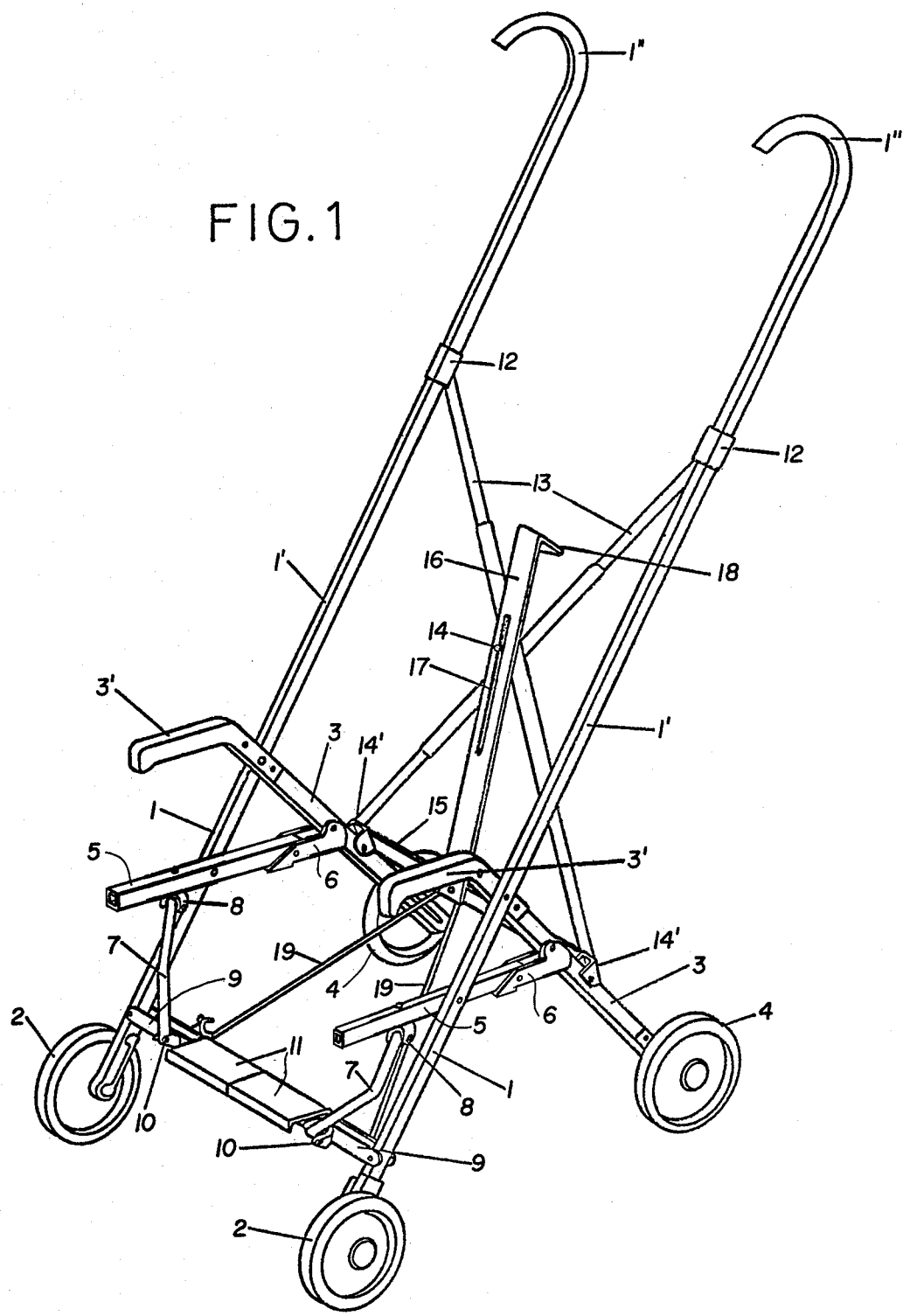
FIG. 1 is a perspective view of a first embodiment of a folding baby carriage according to the present invention, in an opened state.
Figure 2:
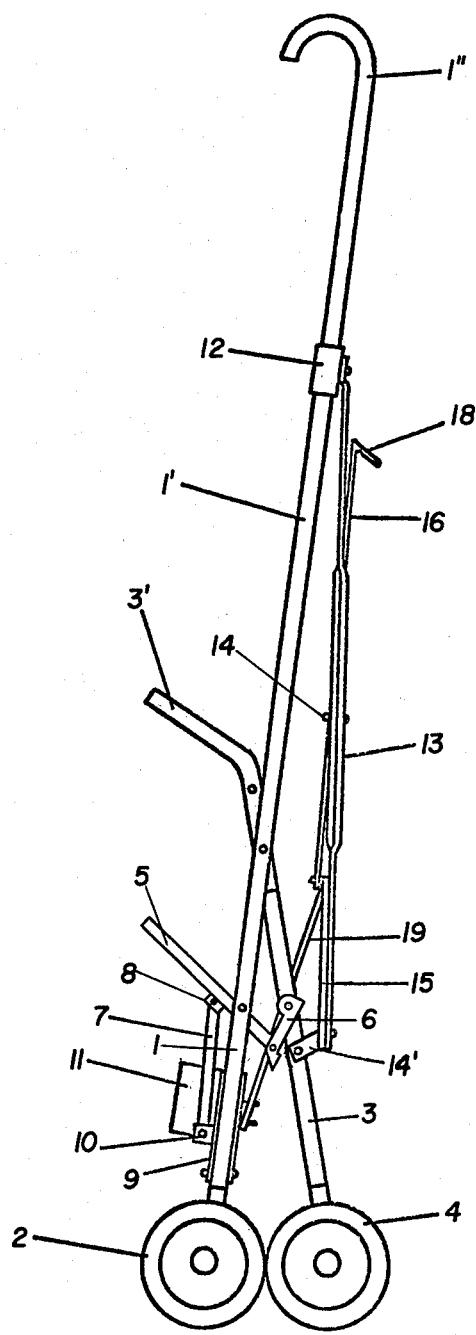
FIG. 2 is a side view of the carriage of FIG. 1 in a folded state.

In an exemplary embodiment of the present invention as illustrated in FIG. 1 and FIG. 2, front legs 1, 1 form respective handle rods 1', 1' at the upper ends thereof, and are provided with respective front wheels 2, 2 at the bottom ends thereof. The handle rods 1', 1' are bent at the top to form respective handles 1", 1". Rear legs 3, 3 are rotatably crossed and mounted to the front legs 1, 1. The rear legs 3, 3 are bent at the upper portion to form armrests 3', 3', and are provided with rear wheels 4, 4 at the bottom. First connecting rods 5, 5 are pivotally provided to the front legs 1, 1. Second connecting rods 6, 6 have a U-shaped section and are pivotally provided to the first connecting rods 5, 5 at the front end, and are pivotally provided to the rear legs 3, 3 at the back end. Because the first connecting rods 5, 5 are pivotally provided to the second connecting rods 6, 6 to be engaged in their front ends having a U-shaped section, the both can be straightened or folded downwardly, but cannot be folded upwardly. Bent rods 7, 7 are rotatably and pivotally provided to the first connecting rods 5, 5 by U-shaped attachments 8, 8. Front supporting rods 9, 9 are pivotally provided to the front legs 1, 1 at one end, and are pivotally and foldably connected to an opposite front supporting rod at the other end. The bent rods 7, 7 are pivotally provided to the front supporting rods 9, 9 by U-shaped attachments 10, 10. Foldable wide footrests 11, 11 are provided on the front supporting rods 9, 9. Sliders 12, 12 are slidably provided on handle rods 1', 1' extending from the front legs 1, 1. Long rods 13, 13 positioned with respect to one another in the form of an X, are pivotally supported by a pin 14. The long rods 13, 13 are pivotally provided to sliders 12, 12 at one end, and are rotatably provided to the rear legs 3, 3 by U-shaped attachments 14', 14' at the other end. Rear supporting rods 15, 15 are pivotally provided to the rear legs 3, 3 at one end, and are pivotally and foldably connected to an opposite rear supporting rod at the other end. An operating rod 16 has an elongate aperture 17 engageable with the pin 14, and are pivotally provided to the rear supporting rod 15, 15 at the bottom. The upper end of the operating rod 16 is bent to form an operating part 18 to pull up the operating rod 16 by hand. Pulling rods 19, 19 are pivotally provided to the bottom of the operating rod 16 at one end, and are pivotally provided to the front supporting rods 9, 9 inside the pivotally providing points with the front legs 1, 1 at the other end. A seat which is not shown is provided wound around the front portion of the first connecting rods 5,5, the handle rods 1', 1', and the armrests 3', 3', being in contact with the operating rod 16 at the back.

An opening and folding operation of the exemplary embodiment of the present invention will be apparent from the following detailed description.

In an opened state in which the folding baby carriage is used as illustrated in FIG. 1, the first connecting rods 5, 5 and the second connecting rods 6, 6 are extended straight between the front legs 1, 1 and the rear legs 3, 3 so that an angle between the front legs 1, 1 and the rear legs 3, 3 is fixedly secured. The front supporting rods 9, 9 and the rear supporting rods 15, 15 are extended straight between the front legs 1, 1 and between the rear legs 3, 3 so that distance between the front legs 1, 1 and between the rear legs 3, 3 is fixedly secured. When the weight of baby is exerted to the first connecting rods 5, 5, the other end of the first connecting rods 5, 5 which are pivotally connected to the second connecting rods 6, 6 are urged to rotate upwardly. Because the first connecting rods 5, 5 are engaged in the front end of the second connecting rods 6, 6 having a U-shaped section, the other end of the first connecting rods 5, 5 cannot rotate upwardly, and the folding baby carriage is locked in an opened state.

Accordingly, even if a force exerted to pull up the operating rod 16 upwardly and to make rotate the front supporting rods 9, 9 upwardly through the pulling rods 19, 19, the front supporting rods 9, 9 cannot be folded upwardly because a force is exerted downwardly to them through the bent rods 7, 7 connected to the first connecting rods 5, 5. Therefore, the folding baby carriage of the present invention is never folded unexpectedly in running even if stones or the like collide with the wheels 2, 2, 4, 4, of the baby carriage.

When the folding baby carriage of the present invention is folded, the handles 1", 1" are held by one hand, and the operating rod 16 is pulled up by the other hand with the operating part 18. The operating rod 16 moves upwardly with the elongate aperture 17 being engaged with the pin 14, and the rod 16 pulls up the rear supporting rods 15, 15 foldedly, and, in turn, pulls up the front supporting rods 9, 9 through the pulling rods 19, 19. The distance between the rear legs 3, 3 and between the front legs 1, 1 decrease, the angle formed by the long rods 13, 13 pivotally provided to the rear legs 3, 3 at the other end, also, decrease, and, at the same time, the sliders 12, 12 at one end of the long rods 13, 13 slide upwardly on the handle rods 1', 1'. The front supporting rods 9, 9 are folded upwardly to push up the first connecting rods 5, 5 through the bent rods 7, 7. The first connecting rods 5, 5 and the second connecting rods 6, 6 are folded mutually to decrease the angle between the front legs 1, 1 and the rear legs 3, 3. When the operating rod 16 is pulled up until the bottom of the engaging aperture 17 of the operating rod 16 contacts with the pin 14, the baby carriage of the present invention is folded into slender form in which the front wheels 2, 2 contact with the rear wheels 4, 4 as illustrated in FIG. 2. In this state, the baby carriage can stand by itself on the front wheels 2, 2 and the rear wheels 4, 4.

When the folding baby carriage of the present invention is opened, the handles 1", 1" are held by one hand, and the operating rod 16 is pushed down by the other hand with the operating part 18. The upper end of the engaging elongate aperture 17 of the operating rod 16 contacts with the pin 14 to push down the long rod 13, 13. The sliders 12, 12 slide downwardly on the handle rods 1', 1' to increase the angle intersected by the long rods 13, 13. At the same time, the operating rod 16 pushes down the rear supporting rods 15, 15 and, in turn, pushes down the front supporting rods 9, 9, through the pulling rods 19, 19. The front supporting rods 9, 9 pull down the first connecting rods 5, 5 through the bent rods 7, 7. The first connecting rods 5, 5 and the second connecting rods 6, 6 extend straight to increase the distance between the front legs 1, 1 and the rear legs 3, 3. The baby carriage is thus brought into the opened state.

Figure 3:
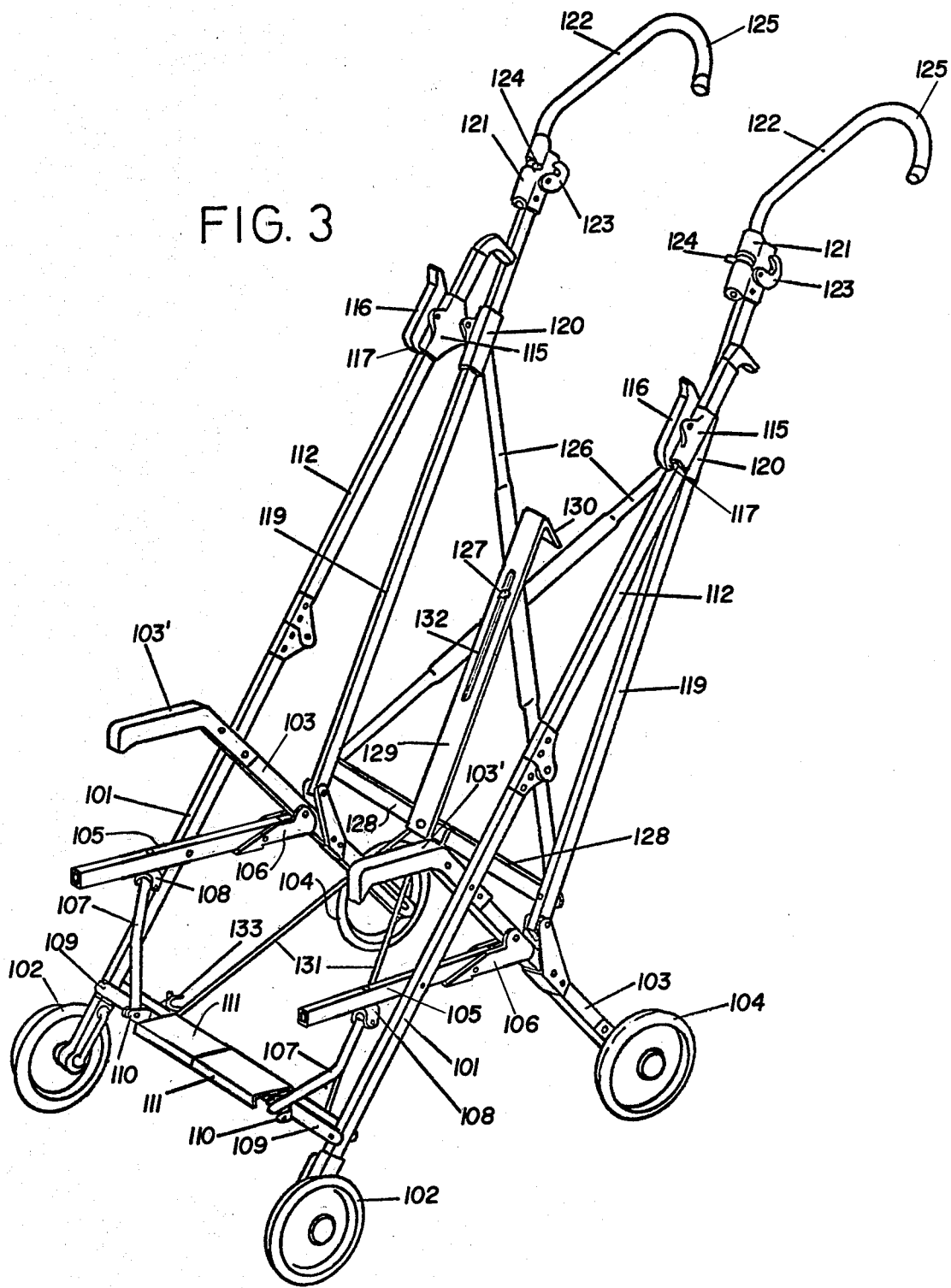
FIG. 3 is a perspective view of a second embodiment of a folding baby carriage according to the present invention, in an opened state.

As illustrated in FIG. 3–6 showing another exemplary embodiment of the present invention, front legs 101, 101 are provided with front wheels 102, 102 at the bottom. Rear legs 103, 103 are rotatably crossed and mounted to the front legs 101, 101. The rear legs 103, 103 are bent at the upper portion to form armrests 103', 103', and are provided with rear wheels 104, 104 at the bottom. First connecting rods 105, 105 are pivotally provided to the front legs 101, 101. Second connecting rods 106, 106 have a U-shaped section and are pivotally provided to the first connecting rods 105, 105 at the front end, and are pivotally provided to the rear legs 103, 103 at the back end. Because the first connecting rods 105, 105 are pivotally provided to the second connecting rods 106, 106 to be engaged in their front ends having a U-shaped section, the both can be straightened or folded downwardly, but cannot be folded upwardly. Bent rods 107, 107 are rotatably and pivotally provided to the first connecting rods 105, 105 by U-shaped attachments 108, 108. Front supporting rods 109, 109 are pivotally provided to the front legs 101, 101 at one end, and are pivotally and foldably connected to an opposite front supporting rod at the other end. The bent rods 107, 107 are pivotally provided to the front supporting rods 109, 109 by U-shaped attachment 110, 110. Foldable wide footrests 111, 111 are provided on the front supporting rods 109, 109. Connecting rods 112, 112 are pivotally provided on the front supporting rods 109, 109. Connecting rods 112, 112 are pivotally provided to the upper end of the front legs 101, 101. The connecting rods 112, 112 can be extended straight with the front legs 101, 101, and can be bent backwardly to the front legs 101, 101 as illustrated in FIG. 3. Stopping apertures 113, 113 and 114, 114 are provided on the connecting rods 112, 112. Movers 115, 115 are slidably provided on the connecting rods 112, 112. A stopping rod 116 is pivotally connected to the mover 115, and has a projection 117 which is engaged with the stopping apertures 113 and 114 of the connecting rod 112. A spring 118 pushes the stopping rod 116 for the projection 117 to be engaged with the stopping aperture 113 or 114. Handle rods 119, 119 are pivotally provided at the middle portion of the rear legs 103, 103 at one end. Sliders 120, 120 are slidable provided on the handle rods 119, 119, and are rotatably connected to the movers 115, 115. Attachments 121, 121 are fixed at the top of the handle rods 119, 119. Handles 122, 122 are circumferentially rotatably connected with the attachments 121, 121. A hook 123 is provided on the side of the attachment 121, and can fix the handle 122 by engagement with a stopping projection 124. The upper portion of the handles 122, 122 is bent to form handle parts 125, 125. The height of the handle parts 125, 125 can be changed by turning the handles 122, 122.

Long rods 126, 126 are formed in X-shaped each other, and pivotally supported by a pin 127. The long rods 126, 126 are pivotally provided to the sliders 120, 120 at one end, and are pivotally provided to the rear legs 103, 103. Operating rod fitting rods 128, 128 are pivotally provided to the bottom of the handle rods 119, 119 at one end, and are pivotally and foldably connected to an opposite rod fitting rod at the other end. An operating rod 129 has an elongate aperture 132 engageable with pin 127, and are pivotally provided to the operating rod fitting rods 119, 119 at the bottom. The upper end of the operating rod 129 is bent to form an operating part 130 to pull up the operating rod 129 by hand. The operating rod 129 is supported by the engagement of the elongate aperture 132 and the pin 127 in this embodiment, but, in other embodiments, the operating rod 129 can be supported by connecting the upper end of the operating rod 129 with the handle rods 119, 119 by connecting rods respectively. Pulling rods 131, 131 are pivotally provided to the bottom of the operating rod 129 at one end, and are pivotally provided to the front supporting rods 109, 109 by U-shaped attachments 133, 133 inside the pivotally providing points with the front legs 101, 101 at the other end. A seat which is not shown is provided wound around the front legs 101, 101, the connecting rods 112, 112, the front portion of the first connecting rods 105, 105, being in contact with the operating rod 129 at the back.

In an opened state in which the folding baby carriage is used as illustrated in FIG. 3, the first connecting rods 105, 105 and the second connecting rods 106, 106 are extended straight between the front legs 101, 101 and the rear legs 103, 103 so that angles between the front legs 101, 101 and the rear legs 103, 103 are fixedly secured. The front supporting rods 109, 109 and the operating rod fitting rods 128, 128 pivotally provided at the bottom of the handle rods 119, 119 near the rear legs 103, 103 are extended straight between the front legs 101, 101 and between the rear legs 103, 103 respectively so that distances between the front legs 101, 101 and between the rear legs 103, 103 is affixedly secured. When the weight of baby exerts to the front portion of the first connecting rods 105, 105, the other ends of the first connecting rods 105, 105 which are pivotally connected to the second connecting rods 106, 106 are forced to rotate upwardly. Because the first connecting rods 105, 105 are engaged in the front ends of the second connecting rods 106, 106 having a U-shaped section, the other end of the first connecting rods 105, 105 cannot rotate upwardly and the folding baby carriage is locked in the opened state.

Accordingly, even if a force is exerted to pull up the operating rod 129 upwardly and to make rotate the front supporting rods 109, 109 upwardly through the pulling rods 131, 131, the front supporting rods 109, 109 cannot be folded upwardly because a force is exerted downwardly to them through the bent rods 107, 107 connected to the first connecting rods 5, 5. Therefore, the folding baby carriage of the present invention is never folded unexpectedly in running even if the stones or the like collide with the wheels of the baby carriage.

Figure 4:
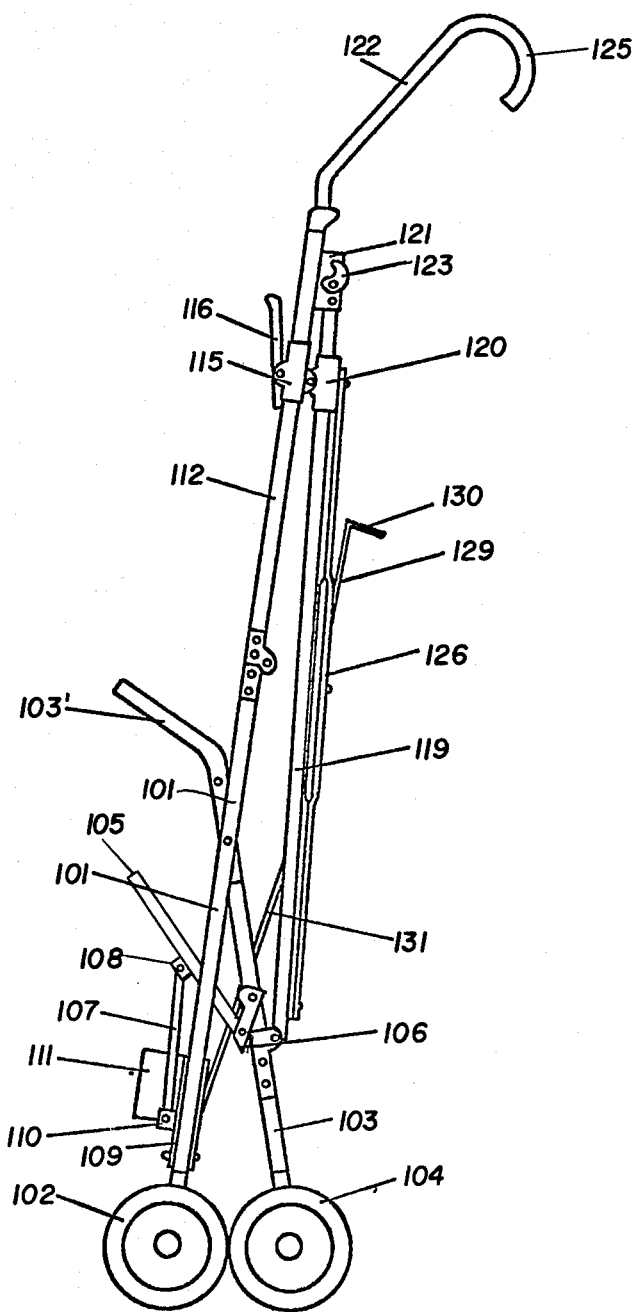
FIG. 4 is a side view of the carriage of FIG. 3 in a folded state.
Figure 6:
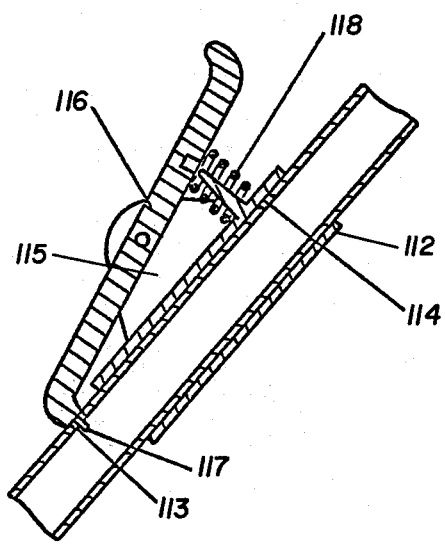
FIG. 6 is a side, partly sectional view of a connecting rod which can be used in carriages made according to the present invention.

When the folding baby carriage of the present invention is folded, the handles 125, 125 are held by one hand, and the operating rod 129 is pulled up by the other hand with the operating part 130. The operating rod 129 moves upwardly with the elongate aperture 132 being engaged with the pin 127, and foldably pulls up the operating rod fitting rods 128, 128, and, in turn, it pulls up the front supporting rods 109, 109 through the pulling rods 131, 131. The distance between the rear legs 103, 103 and between the front legs 101, 101 decrease, the angle formed by the long rods 126, 126 pivotally provided in the vicinity of the pivotally mounting point of the handle rods 119, 119 with the rear legs 103, 103 at the other end, also decrease, and at the same time, the sliders 120, 120 at one end slide upwardly on the handle rods 119, 119. The front supporting rods 109, 109 are folded upwardly to push up the first connecting rods 105, 105 through the bent rods 107, 107. The first connecting rods 105, 105 and the second connecting rods 106, 106 are folded each other to decrease the angle between the front legs 101, 101 and the rear legs 103, 103. When the operating rod 129 is pulled up until the bottom of the engaging elongate aperture 132 of the operating rod 129 contacts with the pin 127, the baby carriage of the present invention is folded into a slender form in which the front wheels 102, 102 contact with the rear wheels 104, 104 as illustrated in FIG. 4. In this state, the baby carriage can stand by itself on the front wheels 102, 102 and the rear wheels 104, 104.

When the folding baby carriage of the present invention is opened, the handle parts 125, 125 of the handle 122, 122 are held by one hand, and the operating rod 129 is pushed down by the other hand with the operating part 130. The upper end of the engaging elongate aperture 132 of the operating rod 129 contacts with the pin 127 to push down the long rods 126, 126. The sliders 120, 120 slide downwardly on the handle rods 119, 119 to open the angle intersected by the long rods 126, 126. At the same time the operating rod 129 pushes down the operating rod fitting rods 128, 128 and, in turn, it pushes down the front supporting rods 109, 109 through pulling rods 131, 131. The front supporting rods 109, 109 pull down the front connecting rods 105, 105 through the bent rods 107, 107. The first connecting rods 105, 105 and the second connecting rods 106, 106 extend straight to increase the distance between the front legs 101, 101 and the rear legs 103, 103. The baby carriage is thus brought into the opened state.

Figure 5:
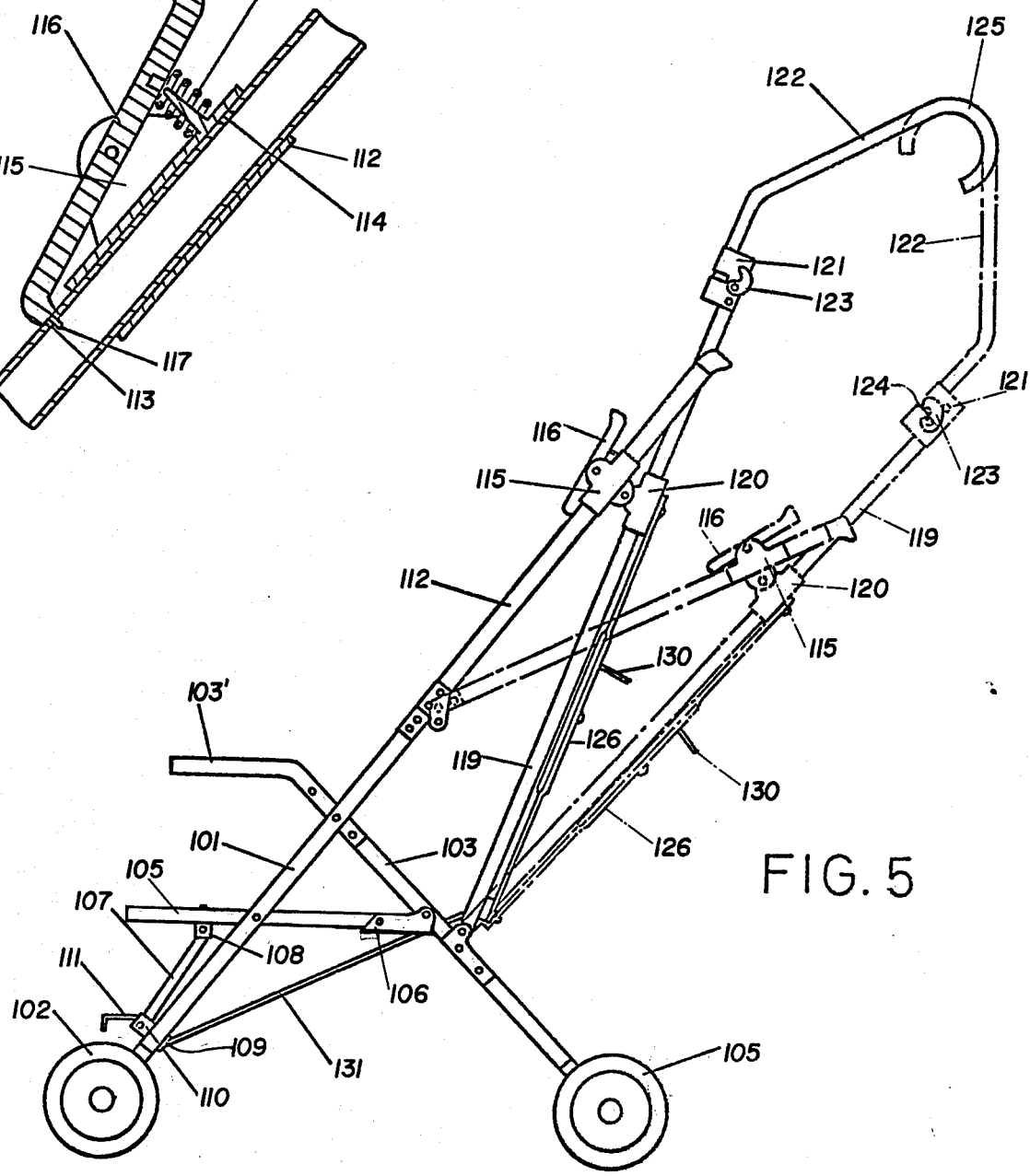
FIG. 5 is a side view of the carriage to FIG. 3 in an opened state.

When the folding baby carriage of the present invention is inclined to a reclined state, the stopping rod 116 of the mover 115 is pushed against the spring 118 to resolve the engagement of the stopping projection 117 with the stopping aperture 113. The movers 115, 115 are rendered slidable on the connecting rods 112, 112. When the connecting rod 112 is bent backwardly at the connecting point with the front leg 101 as illustrated in FIG. 5, the mover 115 slides upwardly on the connecting rod 112. Because the mover 115 is rotatably connected with the slider 120, the handle rod 119 is also inclined backwardly until the stopping rod 116 of the mover 115 is engaged with the upper stopping aperture 114 of the connecting rod 112. In this state, the connecting rod 112 and the handle rod 119 are secured at a predetermined situation as shown with two dots dashed line in FIG. 5. Handle parts 125, 125 can always be kept at a constant height by turning the handles 123, 123.

As described above, the folding baby carriage of the present invention is of quite high safety because it doesn't happen to be folded by mistake or unexpectedly, locked in the opened state certainly. Furthermore, the opening or folding operation of the carriage is executed very easily because there is no special locking device.

It is to be understood that the foregoing text and accompanying figures of drawing have been set out by way of example, not by way of limitation. Other embodiments and variants are possible within the spirit and scope of the invention, its scope being defined by the appended claims.

What is claimed is:

1. A folding baby carriage comprising, in combination:
   front legs;
   rear legs rotatably crossed and mounted to said front legs;
   first connecting rods pivotally coupled to said front legs;
   second connecting rods, having a U-shaped section, pivotally coupled to said first connecting rods at the front end, and pivotally coupled to said rear legs at the back end;
   bent rods pivotally coupled to said first connecting rods at one end; and
   front supporting rods pivotally coupled to said front legs at one end, and pivotally and foldably coupled to an opposite front supporting rod at the other end; and
   wherein the other end of said bent rods is pivotally coupled to said front supporting rods, and
   wherein said first connecting rods and said second connecting rods are straightened for the baby carriage to be locked in an opened state by weight of a baby exerted on front portions of said first connecting rods.

2. A folding baby carriage as set forth in claim 1, including sliders slidably provided on handle rods which extend from said front legs; long rods in X-configuration pivotally coupled to said sliders at one end, pivotally coupled to said rear legs at their respective other ends, and pivotally supported by a pin provided at their intersection;

rear supporting rods pivotally coupled to said rear legs at one end and pivotally and foldably coupled to an opposite rear supporting rod at the other end;

an operating rod having an elongate aperture engageable with said pin, and pivotally coupled to said rear supporting rods at the bottom; and pulling rods pivotally coupled to the bottom of said operating at one end, and pivotally coupled to said front supporting rods at the other end.

3. A folding baby carriage as set forth in claim 1, including connecting rods pivotally coupled to the upper portion of said front legs and having more than two engaging apertures;

movers slidably positioned on said connecting rods and being engageable with said engaging apertures;

handle rods pivotally coupled to said rear legs; and sliders slidably provided on said handle rods and rotatably coupled to said movers, engagement of said movers with said engaging apertures of said connecting rods being changeable to incline said folding baby carriage.

4. A folding baby carriage as set forth in claim 3, including long rods in X-configuration pivotally coupled to said sliders at one end, pivotally coupled to said rear legs at the other end, and pivotally supported by a pin provided at their intersection;

operating rod fitting rods pivotally coupled to the bottom of said handle rods at one end, and pivotally and foldably connected to an opposite operating rod fitting rod at the other end;

an operating rod having an elongate aperture engageable with said pin, and pivotally coupled to said operating rod fitting rods at the bottom; and pulling rods pivotally coupled to the bottom of said operating rod at one end and pivotally coupled to front supporting rods at the other end.

* * * * *